(12) United States Patent
Rushing et al.

(10) Patent No.: US 10,216,640 B2
(45) Date of Patent: Feb. 26, 2019

(54) OPPORTUNISTIC CACHE INJECTION OF DATA INTO LOWER LATENCY LEVELS OF THE CACHE HIERARCHY

(71) Applicant: Samsung Electronics Co., Ltd., Suwon-si, Gyeonggi-do (KR)

(72) Inventors: Andrew J. Rushing, Austin, TX (US); Kevin M. Lepak, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 344 days.

(21) Appl. No.: 14/642,654

(22) Filed: Mar. 9, 2015

(65) Prior Publication Data

US 2015/0269084 A1   Sep. 24, 2015

Related U.S. Application Data

(60) Provisional application No. 61/969,077, filed on Mar. 21, 2014.

(51) Int. Cl.
*G06F 12/1081* (2016.01)
*G06F 12/0897* (2016.01)

(52) U.S. Cl.
CPC ...... *G06F 12/0897* (2013.01); *G06F 12/1081* (2013.01); *G06F 2212/1024* (2013.01); *G06F 2212/152* (2013.01); *G06F 2212/304* (2013.01); *G06F 2213/2806* (2013.01)

(58) Field of Classification Search
CPC ........ G06F 12/0815–12/0837; G06F 12/1081; G06F 2212/621; G06F 2212/1016–2212/1024; G06F 2213/28–2213/2808; G06F 12/0835
See application file for complete search history.

(56) References Cited

U.S. PATENT DOCUMENTS

| | | | |
|---|---|---|---|
| 5,802,576 A * | 9/1998 | Tzeng | G06F 12/0835 711/146 |
| 5,893,153 A | 4/1999 | Tzeng et al. | |
| 6,546,462 B1 | 4/2003 | Palanca et al. | |
| 6,636,906 B1 * | 10/2003 | Sharma | G06F 12/0835 710/22 |
| 7,325,108 B2 | 1/2008 | Tuel | |
| 8,127,079 B2 | 2/2012 | Heil et al. | |
| 8,364,899 B2 | 1/2013 | Ambroladze et al. | |

(Continued)

FOREIGN PATENT DOCUMENTS

| CN | 101446923 A | 6/2009 |
|---|---|---|
| CN | 102693187 B | 9/2012 |

(Continued)

*Primary Examiner* — Nicholas J Simonetti
(74) *Attorney, Agent, or Firm* — Renaissance IP Law Group LLP

(57) ABSTRACT

According to one general aspect, a method may include receiving a request, from a non-central processor device that is configured to perform a direct memory access, to write data within a memory system at a memory address. The method may also include determining if a cache tag hit is generated, based upon the memory address, by a caching tier of the memory system that is closer, latency-wise, to a central processor than a coherent memory interconnect. The method may further include if the caching tier generated the cache tag hit, injecting the data into the caching tier.

20 Claims, 7 Drawing Sheets

(56) References Cited

U.S. PATENT DOCUMENTS

| | | |
|---|---|---|
| 10,025,711 B2 | 7/2018 | Sassone et al. |
| 2007/0101026 A1* | 5/2007 | Lai ...................... G06F 13/4059 710/8 |
| 2008/0183967 A1 | 7/2008 | Speier et al. |
| 2008/0307168 A1* | 12/2008 | Lilly .................. G06F 12/0831 711/146 |
| 2010/0070712 A1* | 3/2010 | Arimilli ................ G06F 12/127 711/122 |
| 2010/0318713 A1 | 12/2010 | Deshpande |
| 2011/0010501 A1 | 1/2011 | Glover et al. |
| 2013/0191600 A1 | 7/2013 | Kuesel et al. |

FOREIGN PATENT DOCUMENTS

| | | |
|---|---|---|
| JP | H04130551 A | 5/1992 |
| JP | 2003345653 A | 12/2003 |
| TW | 201342062 A | 10/2013 |
| TW | 201351146 A | 12/2013 |

\* cited by examiner

100

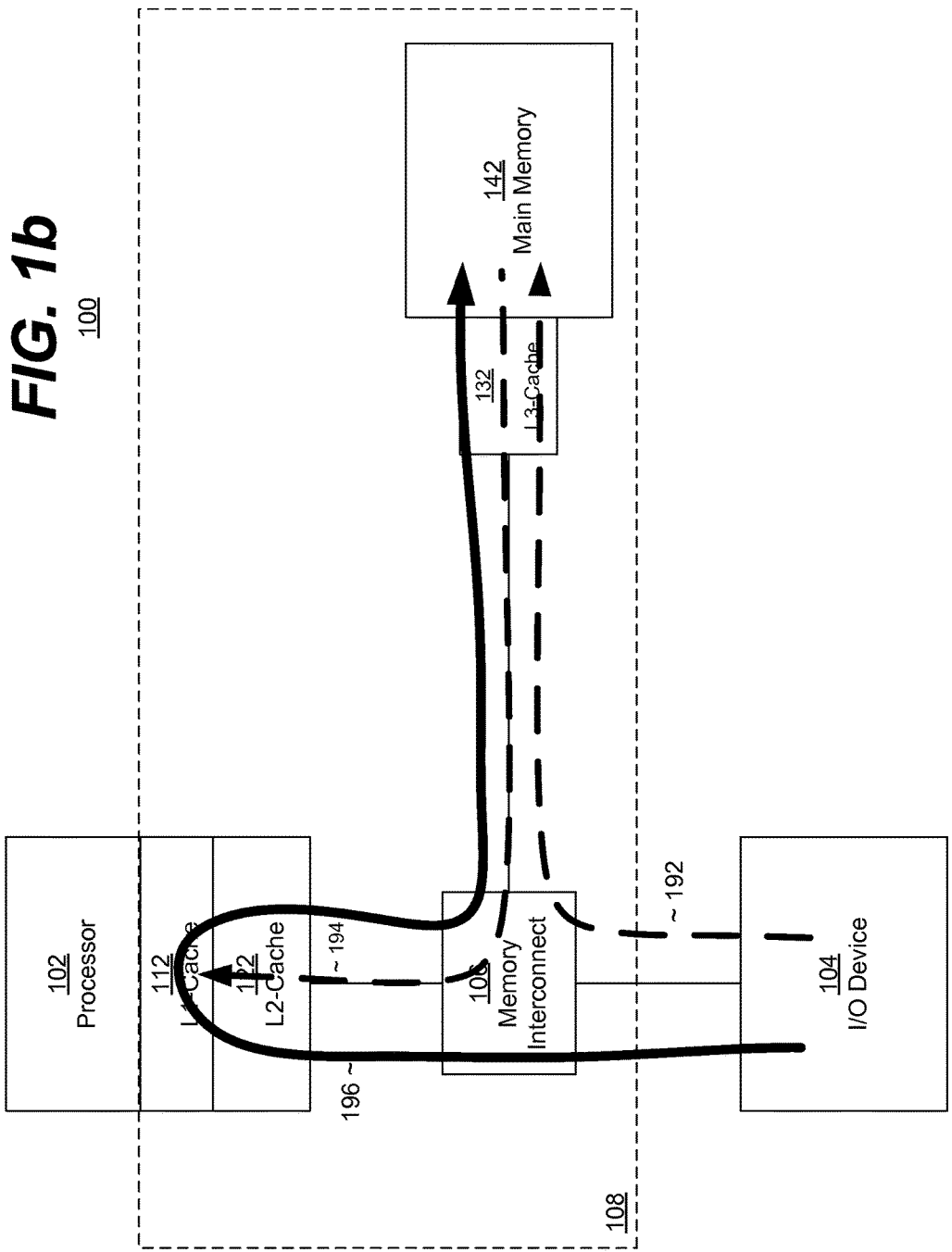

200

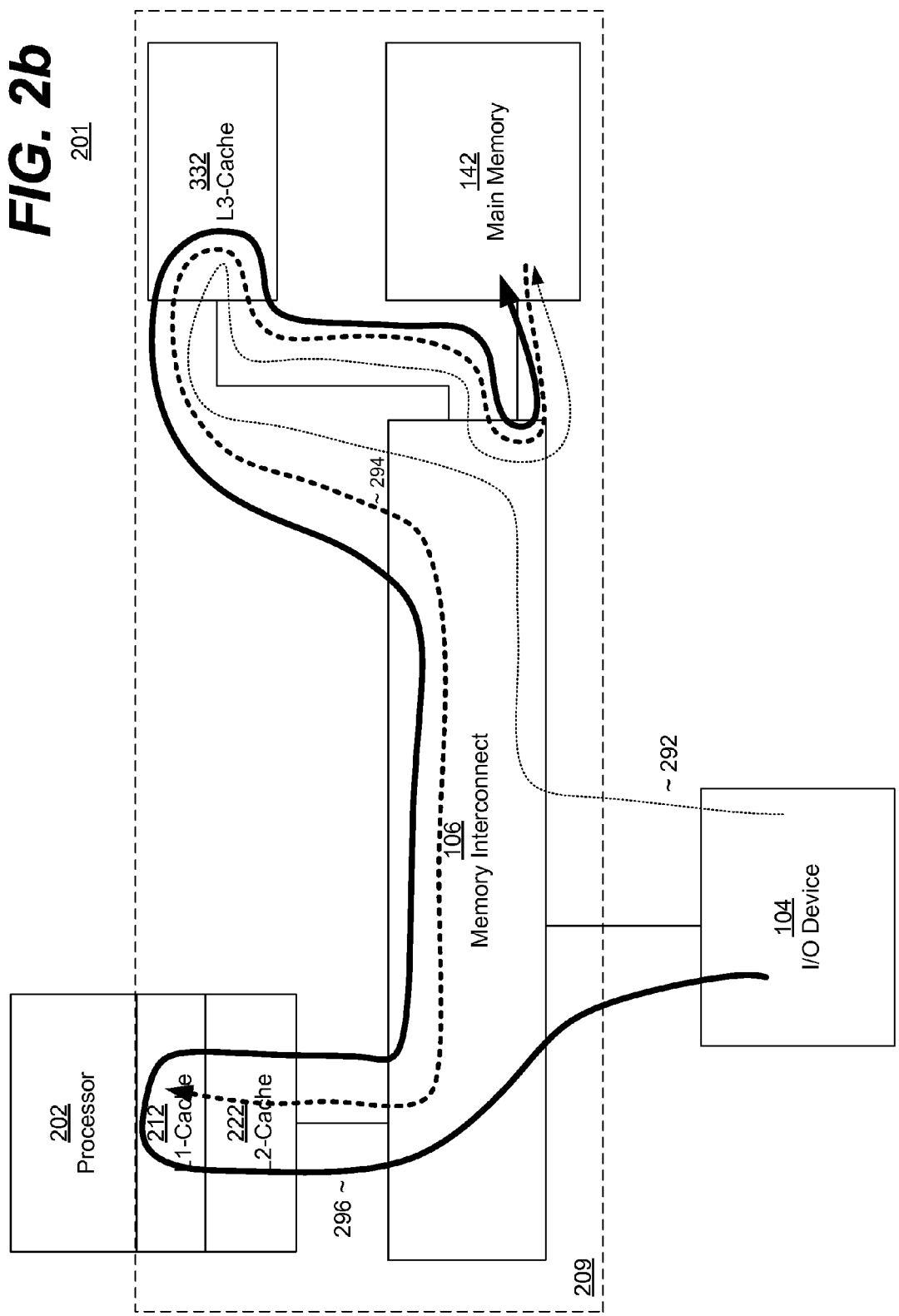

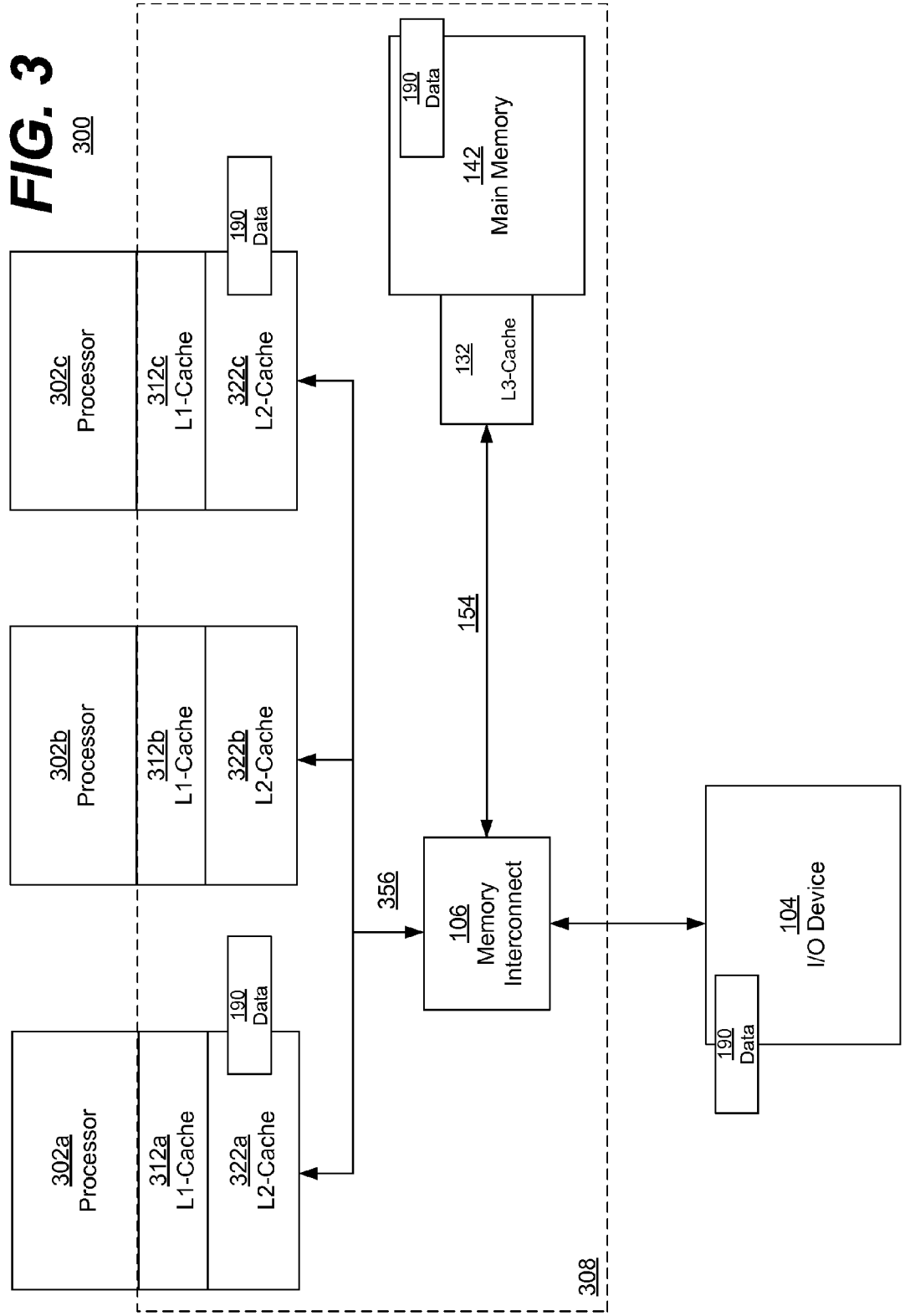

400

OPPORTUNISTIC CACHE INJECTION OF DATA INTO LOWER LATENCY LEVELS OF THE CACHE HIERARCHY

CROSS-REFERENCE TO RELATED APPLICATION

This application claims priority under 35 U.S.C. § 119 to Provisional Patent Application Ser. No. 61/969,077, entitled "METHOD FOR OPPORTUNISTIC CACHE INJECTION OF DATA INTO LOWER LATENCY LEVELS OF THE CACHE HIERARCHY TO IMPROVE PERFORMANCE WHERE AN UNINTELLIGENT I/O DEVICE OR DMA MASTER PRODUCES DATA TO BE CONSUMED BY SOFTWARE RUNNING ON A CPU CORE" filed on Mar. 21, 2014. The subject matter of this earlier filed application is hereby incorporated by reference.

TECHNICAL FIELD

This description relates to memory management, and, more specifically, to the management of a portion of memory associated with a portion of cacheable memory used for communication between an input/output (I/O) device and software running on a processor.

BACKGROUND

Generally, computers and the programs executed by them have a voracious appetite for unlimited amounts of fast memory. Unfortunately, memory (especially fast memory) is generally expensive both in terms of cost and die area. The traditional solution to the desire for unlimited, fast memory is a memory hierarchy or system of tiers or levels of memories. In general, the tiered memory system includes a plurality of levels of memories, each level slower but larger than the previous tier.

A typical computer memory hierarchy may include three levels. The fastest and smallest memory (often called a "Level 1 (L1) cache") is closest to the processor and includes static random access memory (RAM and SRAM). The next tier or level is often called a Level 2 (L2) cache, and is larger but slower than the L1 cache. The third level is the main memory and generally includes dynamic RAM (DRAM), often inserted into memory modules. However, other systems may have more or less memory tiers. Also, in some systems, the processor registers and the permanent or semi-permanent storage devices (e.g., hard drives, solid-state drives, etc.) may be considered part of the memory system.

SUMMARY

According to one general aspect, a method may include receiving a request, from a non-central processor device that is configured to perform a direct memory access, to write data within a memory system at a memory address. The method may also include determining if a cache tag hit is generated, based upon the memory address, by a caching tier of the memory system that is closer, latency-wise, to a central processor than a coherent memory interconnect. The method may further include if the caching tier generated the cache tag hit, injecting the data into the caching tier.

According to another general aspect, an apparatus may include a high latency memory, a low latency memory, and a memory interconnect. The high latency memory may be configured to store data, wherein the high latency memory is further, latency-wise, from a central processor than a memory interconnect. The low latency memory may be configured to store data, wherein the low latency memory is closer, latency-wise, to a central processor than the memory interconnect. The memory interconnect may be configured to receive a request, from a non-central processor device that is configured to perform a direct memory access, to write data at a memory address, request that the low latency memory provide, based upon the memory address, the memory interconnect with either a cache tag hit or a cache tag miss, and if the low latency memory provided a cache tag hit, inject the data into the low latency memory.

According to another general aspect, a system may include a processor, a non-central processor device, and a tiered memory system. The processor may be configured to read data from and write data to a tiered memory system. The non-central processor device may be configured to perform a direct memory access to the tiered memory system, and request to write data to the tiered memory system. The tiered memory system may include a high latency memory, a low latency memory, and a memory interconnect. The high latency memory may be configured to store data, wherein the high latency memory is further, latency-wise, from a central processor than a memory interconnect. The low latency memory may be configured to store data, wherein the low latency memory is closer, latency-wise, to a central processor than the memory interconnect. The memory interconnect may be configured to receive a request, from a non-central processor device that is configured to perform a direct memory access, to write data at a memory address, request that the low latency memory provide, based upon the memory address, the memory interconnect with either a cache tag hit or a cache tag miss, and if the low latency memory provided a cache tag hit, inject the data into the low latency memory.

The details of one or more implementations are set forth in the accompanying drawings and the description below. Other features will be apparent from the description and drawings, and from the claims.

A system and/or method for memory management, and, more specifically, to the management of a portion of memory associated with a portion of cacheable memory used for communication between an input/output (I/O) device and software running on a processor, substantially as shown in and/or described in connection with at least one of the figures, as set forth more completely in the claims.

BRIEF DESCRIPTION OF THE DRAWINGS

FIG. 1b is a block diagram of an example embodiment of a system in accordance with the disclosed subject matter.

FIG. 2b is a block diagram of an example embodiment of a system in accordance with the disclosed subject matter.

FIG. 3 is a block diagram of an example embodiment of a system in accordance with the disclosed subject matter.

Like reference symbols in the various drawings indicate like elements.

DETAILED DESCRIPTION

Figure 1A:
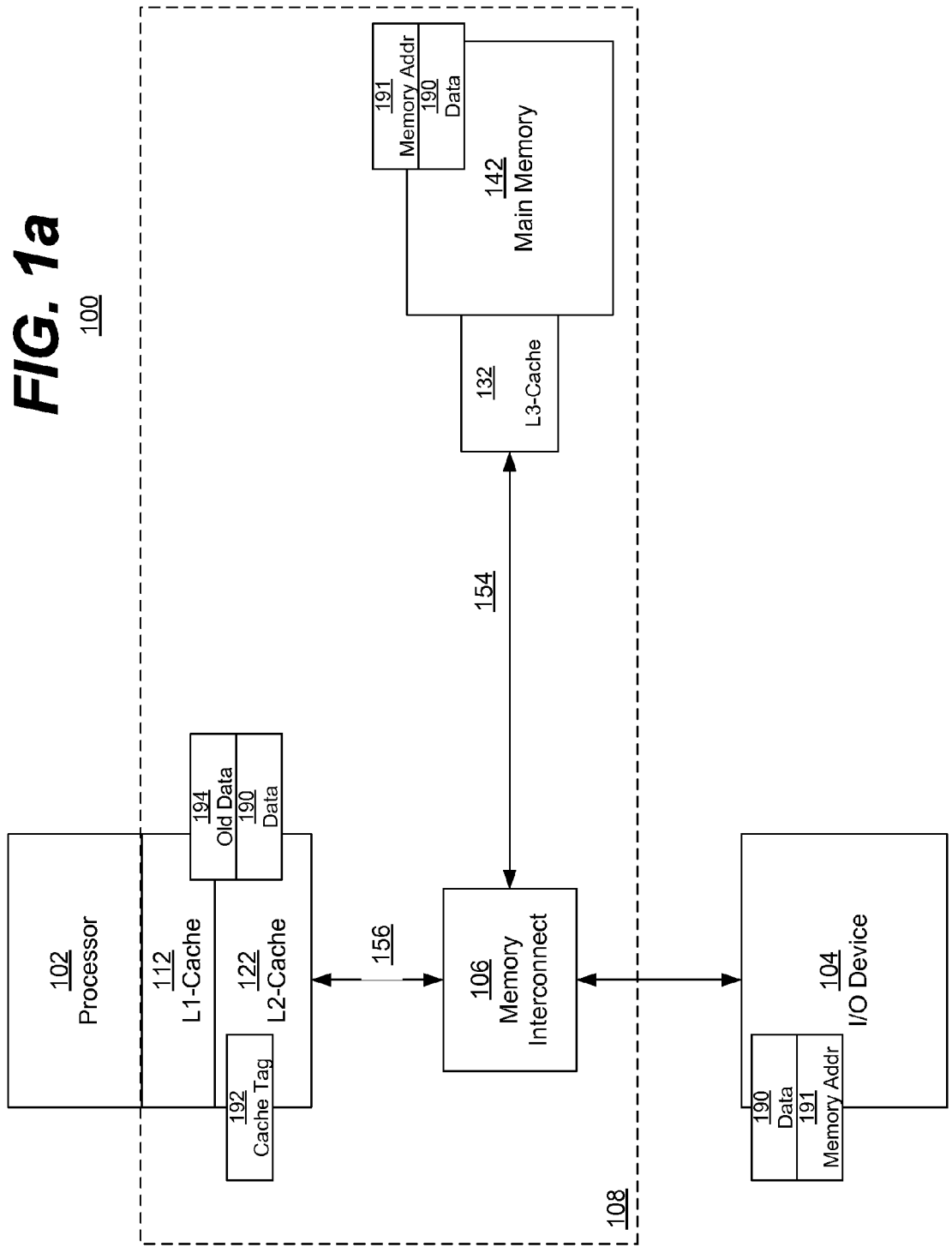
FIG. 1a is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

In a shared memory multiprocessor system with a separate cache memory for each processor, it is possible to have many copies of any one piece of data, for example, one copy in the main memory and one in each cache memory. When one copy of a piece of data is changed, the other copies of the data should, ideally, be changed. Cache coherence is the technique that ensures that changes in the values of shared data are propagated throughout the system in a timely fashion.

One technique of enforcing cache coherence is to ensure that a processor has exclusive access to a data item before it writes that item. This style of protocol is called a write invalidate protocol because it invalidates copies in other caches on a write, and is generally considered to be part of a more general snooping style of protocols. Exclusive access, in this case, ensures that no other readable or writable copies of an item exist when the write occurs: all other cached copies of the item are invalidated.

To see how this protocol ensures coherence, consider a write by a first processor followed by a read by another processor. In this example, one assumes that two processors exist, with their two respective caches, and that each cache holds or stores a copy of a piece of data. In such an example, both copies of the data have recently been read and therefore include the most up to date version of the data. The piece of data may be considered shared between the two caches.

In this example, a first processor attempts to write to its copy of the data. As a first step, the first processor sends out or broadcasts a snoop request to the rest of the memory system asking if any other caches are currently storing a copy of the data. Generally, this is done by comparing the memory address of the data to the various cache tags of the caches. The other processors or caches respond to the snoop request with a snoop response. Each snoop response indicates whether the memory address in question is included in the respective cache (a cache tag hit) and, if so, the coherency state of the cached data (e.g., valid, invalid, shared, exclusive, etc.) is also included. To simplify this example, it is assumed that if any cache tag hits occur, they will be shared or non-exclusive and that the write may proceed without complication.

Since the write requires exclusive access, any copy held by the other processor, in their respective caches, is invalidated (hence the protocol name of "write-invalidate"). Thus, when the a second processor wishes to read the same data, the invalid data in its cache causes a cache miss, and the cache is forced to fetch a new copy of the data.

In various embodiments, other protocols may be employed such as a write-update technique, a directory protocol, a snarfing protocol, etc. It is understood that the above are merely a few illustrative examples to which the disclosed subject matter is not limited.

Often computing systems are coupled with one or more input/output devices or peripheral devices (e.g., I/O device 104 of FIG. 1a). Such devices may include, but are not limited to, a network interface, a microphone, a video camera, video graphics card, a co-processor (e.g., an encryption engine, a physics engine, etc.), etc. It is understood that the above are merely a few illustrative examples to which the disclosed subject matter is not limited. Occasionally these I/O devices operate relatively independently from the main processor. This removes a good deal of management duties from the processor, but generally results in some difficulties. In this context, devices such as these and other devices that may access memory but are not processors or processor cores may be referred to as "non-central processor devices". For the sake of illustrative example, the term "I/O device" may be used herein, but it is understood that the term is merely one illustrative example to which the disclosed subject matter is not limited.

In such an embodiment, the I/O device may be able to directly access (e.g., read, write, etc.) portions of memory. In various embodiments, these portions of memory may be restricted such that the I/O device has special privileges compared to other devices (e.g., only the I/O device may write to the memory portion but other devices may read from it, etc.). In various embodiments, this may be referred to as direct memory access (DMA). It is understood that the above is merely an illustrative example to which the disclosed subject matter is not limited.

Cache injection is an architectural feature that allows I/O devices to initiate bus transactions (e.g., data writes, etc.) directed to a target device (a cache or caching tier of a memory system, etc.). Traditionally, in a system without cache injection, this target device is the main memory controller. With cache injection, the transaction can be directed to a particular cache in the system. The target devices then snoops the bus to check whether they can match the target. If so, the target consumes the data, otherwise the memory controller does.

Likewise, with the multi-processor cache coherency example above, the writing of data from an I/O device into memory may include various cache coherency issues. A first cache injection implementation may exist where I/O DMA masters explicitly and selectively tag their write transactions with an allocate/update attribute that the memory interconnect and cache controllers respond to. A second cache injection implementation may exist where specific address ranges of memory are configured within the caches to inform them to "claim" snoops associated with I/O write transactions/cache lines that should be allocated or updated.

A third cache injection implementation may exist where the I/O write transactions naturally flow through a level of the cache hierarchy that sits in-line with the DRAM (dynamic random access memory) controller. In such an implementation, data stored within the cache lines of that inline cache may be updated with a new version of the data when an I/O write passes through the cache on its way to DRAM. That is to say, as the I/O write is sending new data to the DRAM, the new data will also be transmitted through the inline cache, as it is between the I/O device and the DRAM, as described below.

In this context, a memory, cache, or tier is considered "in-line" with the main memory if there exists a path for write transactions originating from a sending entity (e.g., the I/O Device, Processor, L1 cache, etc.) to allocate into or update the next-higher latency level of the memory/cache hierarchy as those writes make their way toward main memory (e.g., DRAM). Conversely, in this context, a memory, cache, or tier is considered "out-of-line" with the main memory if does not exist in a path for write transactions originating from the sending entity to allocate into or update the next-higher latency level of the memory/cache hierarchy as those writes make their way toward main memory.

A fourth cache injection implementation may exist where a hardware queue manager offload or accelerator block tracks exactly what unit of work the processor core is currently processing and all the work queued up for it to do in the future. Instead of the data being allocated/updated when the I/O device writes/produces the data to memory, the queue manager instructs the data to be put in the cache only when the processor core gets close to the point where it will consume it in a "timely" manner. It is understood that the above are merely a few illustrative examples to which the disclosed subject matter is not limited.

As described below, the disclosed subject matter provides various potentially useful modifications compared to the above cache injection implementation techniques. Among those potentially useful modifications are, but not limited solely to, the below.

In contrast to the first cache injection implementation, the disclosed subject matter does not require the I/O master to generate, and the memory interconnect to transport, an explicit allocate/update attribute. Nor, does the disclosed subject matter cause an immediate eviction of potentially useful cache lines in the cache hierarchy. Further, the disclosed subject matter may be simpler to implement because the I/O device does not have to change and may remain unintelligent.

In contrast to the second cache injection implementation, the disclosed subject matter does not require software to initialize the cache controller configuration space with special address ranges/windows, nor does it require special restrictions and/or understanding of where data structures will be allocated by software.

In contrast to the third cache injection implementation, the disclosed subject matter enables updating of stale cache lines by looking at a different level or tier of the cache hierarchy that I/O writes normally destined for DRAM don't naturally pass through. Further, the disclosed subject matter increases the processor core fetch latency benefit by supporting cache line updates or injection into a lower latency level of the cache hierarchy (e.g., the L1 cache, the L2 cache, etc.).

In contrast to the fourth cache injection implementation, the disclosed subject matter does not require a separate hardware queue manager block that the I/O device and processor core communicates with. Further, the disclosed subject matter may be simpler to implement than the fourth cache injection implementation. It is understood that the above are merely a few illustrative examples to which the disclosed subject matter is not limited.

The following provides a brief and general overview of a usage case of the disclosed subject matter. Further, below, a more detailed illustrative example is also provided. Following the detailed illustrative example are a few non-limiting variations of the disclosed subject matter. It is understood that the below are merely a few illustrative examples to which the disclosed subject matter is not limited.

FIG. 1a is a block diagram of an example embodiment of a system 100 in accordance with the disclosed subject matter. In various embodiments, the system 100 may include a processor 102, a tiered memory system 108, and one or more input/output (I/O) devices 104. In the illustrated embodiment, the tiered memory system 108 may include three tiers (from smallest to largest): a L1 cache 112, a level 2 (L2) cache 122, a level 3 (L3) cache 132, and a main memory 142. It is understood that the above is merely one illustrative example to which the disclosed subject matter is not limited.

In various embodiments, the I/O device 104 may be given access to a specified portion of memory. In various embodiments, this portion may be defined by one or more ranges of memory addresses. In such an embodiment, when the I/O device 104 wishes to read or write data 190 to/from the reserved portion of memory, the access request may be associated with or include the memory address 191 associated with the data 190. In such an embodiment, the entire reserved memory portion need not be read from or written to in whole or at once.

In such an embodiment, cache lines containing stale data structures that were or are associated with I/O device 104 to processor 102 communication may remain in the cache hierarchy (e.g., the L2 cache 122, etc.) long after software running on the processor 102 consumes the data. In various embodiments, software may frequently reuse the memory addresses associated with these stale data structures and give or return ownership to an I/O device 104 to write or produce new data into. In some embodiments, these addresses may be used for the same type of data structures and data flows over and over, such as, for example, circular descriptor queues/rings and data buffer pool entries that an I/O device 104 writes data into and software may consume in the future. It is understood that the above are merely a few illustrative examples to which the disclosed subject matter is not limited.

In the illustrated embodiment, when an I/O device 104 wishes to coherently write to a cache (e.g., with the data 190, etc.), the system 100 may generate a snoop request/response pair of messages. If the corresponding snoop transaction hits on a cache line (e.g., a cache tag hit, either valid or invalid) in the processor 102's cache hierarchy (e.g., the L2 cache 122), the cache tag hit may provide a hint regarding the future consumption of data associated with the cache line by software. In various embodiments, it may be advantageous to allocate/update the data associated with this cache line and overwrite the stale data in the cache without evicting useful data from the cache In some embodiments, the disclosed subject matter may eliminate the full portion of the power associated with a write to DRAM or main memory 142. As a new I/O write occurs, data may be owned by a cache (e.g., the L2 cache 122, etc.) in a modified state. The disclosed subject matter may eliminate or reduce a portion of the roundtrip read latency to main memory 142 and the full portion of the power employed for a main memory 142 read that is encountered when the processor 102 ultimately fetches this cache line to consume the data structure (e.g., via a read that hits in processor 102 cache hierarchy). It is understood that the above is merely one illustrative example to which the disclosed subject matter is not limited.

In another embodiment, the cache line that was allocated/updated by the I/O write transaction may be naturally evicted out of the cache hierarchy and written to main memory 142 prior to the processor 102 fetching it for consumption. In such an embodiment, this may be no worse than if the I/O write was completed to main memory 142 and the snoop associated with it simply invalidated the cache line containing stale data in the cache instead of triggering an allocation/update of the cache line. It is understood that the above is merely one illustrative example to which the disclosed subject matter is not limited.

In some embodiments, even in the case of I/O write transactions naturally flowing through only the level of the cache hierarchy that sits in-line with the main memory 142 (e.g., a shared L3 cache 132, etc.), it may be advantageous to add the control and data-path logic to support allocating and/or updating stale cache lines that are present in the upper levels of the cache hierarchy (e.g., the L1 cache 112, the L2 cache 122, etc.). For example, the processor 102's fetch latency benefit may be increased by supporting these updates into a lower latency level of the cache hierarchy. It is understood that the above are merely a few illustrative examples to which the disclosed subject matter is not limited.

Regarding a more detailed and concrete illustrative example, an I/O device 104 (or other DMA non-processor device) may wish write data 190 to a tiered memory system 108. In the illustrated embodiment, the I/O device 104 may issue a traditional write transaction that includes the data 190 but does not overtly include an indication that the write involves a specific form of opportunistic cache injection. In such an embodiment, the write transaction or request may be associated with a memory address 191.

In the illustrated embodiment, the write request may be received by the memory interconnect 106. In various embodiments, the memory interconnect 106 may be referred to as a coherent interconnect, or coherent memory interconnect. It is understood that the above are merely a few illustrative examples to which the disclosed subject matter is not limited.

In various embodiments, the memory interconnect 106 may send snoop requests to the various caching tiers. In the illustrated embodiment, the memory interconnect 106 may send a snoop request via path 154 towards the L3 cache 132 and ultimately the main memory 142. In the illustrated embodiment, the memory interconnect 106 may also send a snoop request via path 156 towards the L2 cache 122, and/or the other caches (e.g., the L1 cache 112, etc.) that are between the memory interconnect 106 and the processor 102.

In the illustrated embodiment, the main memory 142 may store the data 190 at memory address 191. In such an embodiment, the main memory 142 may respond to the snoop request with a cache tag hit. However, the L2 cache 122 may also store the data 190 (represented as old data 194), and the data 194 may be associated with the cache tag 192, which is in turn associated with the memory address 191. In such an embodiment, the L2 cache 122 may respond to the snoop request with a cache tag hit.

In such an embodiment, the memory interconnect 106 may be configured to determine if a cache tag hit was generated by a caching tier of the memory system 108 that is closer, latency-wise, to a processor 102 than the coherent memory interconnect 106. In the illustrated embodiment, the main memory 142 is further, latency-wise, from the processor 102 than the memory interconnect 106, and therefore it may not be the desired caching tier to accept the write data 190 from the I/O device 104. Conversely, the L2 cache 122 is closer, latency-wise, from the processor 102 than the memory interconnect 106, and may therefore it may be considered the desirable caching tier to accept the write data 190 from the I/O device 104. It is understood that the above are merely a few illustrative examples to which the disclosed subject matter is not limited. Specifically, other more complex examples are discussed in relation to FIGS. 2a, 2b, and 3.

In such an embodiment, the memory interconnect 106 may inform the L2 cache 122 to expect write data (data 190) to be pushed or injected into it. In some embodiments in which the data 190 includes a partial cache line the injection may take the form of a cache line merge or update. In some embodiments in which the data 190 includes a full cache line the injection may take the form of a cache line overwrite. In the illustrated embodiment, the memory interconnect 106 may perform the cache injection into the caching tier (e.g., the L2 cache 122).

Some aspects of the above-described example will now be further highlighted. As described above, in various embodiments, it may not matter if the cache tag hit from the L2 cache 122 was a valid or invalid cache tag hit. In such an embodiment, a cache tag hit alone may provide a hint or indication of future consumption of data 190 by software or the processor 102 and it may be advantageous to allocate and/or update the data 190, even if such an update means overwriting the stale data 194 in the cache. In such an embodiment, this may be done without evicting other, useful data from the cache. In such an embodiment, the danger of cache pollution (populating the cache with data that is unlikely to be desired by the processor 102) may be reduced or tempered.

In another aspect of the above-described example, it is noted that traditionally logic and circuits for cache injection on a cache tag hit are not supported for non-in-line caches (e.g., the L1 cache 112, the L2 cache 122, etc.). Traditionally, control and data-path logic or circuits exists to enable an I/O device 104 to update only those caches (on a cache tag hit) that are in-line with the normal path to main memory 142 from the memory interconnect 106 (e.g., the L3 cache 132, main memory 142, etc.).

There may be significant cache capacity sitting closer to the processor 102 that is not in-line (e.g., the L1 cache 112, the L2 cache 122, etc.). In various embodiments, such caches may frequently hold stale and/or useless versions of data (e.g., old data 194) that I/O devices 104 write to. In another embodiment, in-line caches (e.g., the L3 cache 132, etc.) may not even be present, and therefore the inability of traditional systems to write to non-in-line caches (e.g., the L2 cache 122, etc.) may reduce performance. Such a lack of an in-line cache (e.g., the L3 cache 132, etc.) may be common with implementations that have large, shared L2 caches, which are not in-line. It is understood that the above is merely one illustrative example to which the disclosed subject matter is not limited.

In another alternative embodiment that differs in some ways from the above example, upon receiving the cache tag hits from the L2 cache and the main memory 142, the memory interconnect 106 may, instead of directly writing the data 190 into the L2 cache 122, cause a cache line invalidation in the L2 cache 122 (and possibly the L1 cache 112). In such an embodiment, this may cause the L2 cache 122 to issue a read request for the data 190 (or memory address 191) in order to take ownership of the modified or changed data 190. In such an embodiment, this modified or changed data 190 may be buffered within the memory interconnect 106. Therefore, the latency incurred by the read may be less than a read that requires accessing the main memory 142 instead of the memory interconnect 106. In various embodiments, this read request may be thought of as causing the L2 cache 122 to pre-fetch the updated data 190 into the L2 cache 122.

In such an embodiment, the write from the I/O device 104 may include a full cache line such that the subsequent read from the non-in-line cache (e.g., the L2 cache 122, etc.) may be for a full cache line. In another variant of this embodiment, if the write data (data 190) is written through to the main memory 142, then the read issued by the L2 cache 122 may not be for ownership of the modified or updated data 190, as the cache line may allocate in a clean state. It is understood that the above are merely a few illustrative examples to which the disclosed subject matter is not limited.

To describe another variation or instance of the disclosed subject matter, in some embodiments, the data 190 may not be stored within either the L1 cache 112 or the L2 cache 122. As such, the snoop request may not generate a cache tag hit (either valid or invalid) from those caches or any non-in-line caches. In such an embodiment, the memory interconnect 106 may not have a caching tier of the memory system 108 that is closer, latency-wise, to the processor 102 than a coherent memory interconnect 106 that is a good candidate for cache injection. In such an embodiment, the memory interconnect 106 may inject the data 190 into a caching tier that is further, latency-wise, from the central processor 102 than the coherent memory interconnect 106 (e.g., the main memory 142). It is understood that the above are merely a few illustrative examples to which the disclosed subject matter is not limited.

FIG. 1b is a block diagram of an example embodiment of the system 100 in accordance with the disclosed subject matter (which is also shown in FIG. 1a). FIG. 1b highlights a difference in the way a traditional system and the disclosed subject matter move data.

FIG. 1b shows the traditional data paths employed by traditional system in which data is sent from the I/O device 104 (or non-processor DMA device) and the main memory 142 (illustrated via path 192). Afterwards, the data is moved from the main memory 142 to the L2 cache 122 or L1 cache 112 (illustrated via path 194). In such an embodiment, the latencies experienced by the processor 102 are relatively high.

Conversely, data path 196 illustrates that in the disclosed subject matter, data may be moved directly from the I/O device 104 to the L2 cache 122 (or L1 cache 112) via opportunistic cache injection that reduces or tempers potential cache pollution. Data path 196 also illustrates that eventually, the data may be moved from the L2 cache 122 to main memory 142. It is understood that similar data paths may be drawn for the systems of FIGS. 2a and 3, or for other embodiments of the disclosed subject matter. It is understood that the above is merely one illustrative example to which the disclosed subject matter is not limited.

Figure 2A:
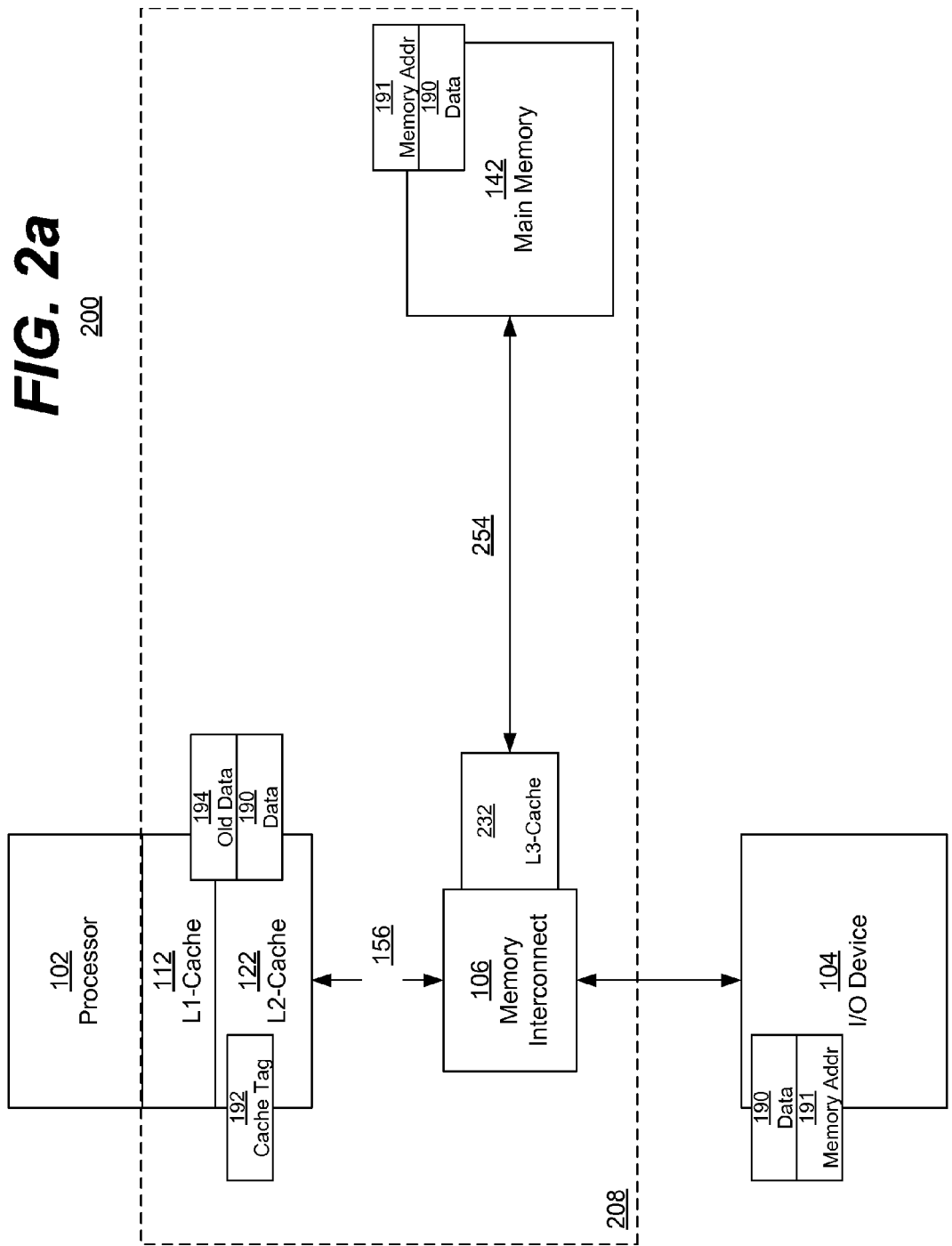
FIG. 2a is a block diagram of an example embodiment of a system in accordance with the disclosed subject matter.

FIG. 2a is a block diagram of an example embodiment of the system 200 in accordance with the disclosed subject matter. In various embodiments, the system 200 may include a processor 102, a tiered memory system 208 and one or more input/output (I/O) devices 104. In the illustrated embodiment, the tiered memory system 208 may include three tiers (from smallest to largest): a L1 cache 112, a level 2 (L2) cache 122, a level 3 (L3) cache 232, and a main memory 142. It is understood that the above is merely one illustrative example to which the disclosed subject matter is not limited.

The system 100 of FIG. 1*a* showed a tiered memory system 108 that includes an L3 cache 132 that was, at least illustratively, coupled closely with the main memory 142. The system 200 of FIG. 2*a* shows a tiered memory system 208 that includes an L3 cache 232 that is, at least illustratively, coupled closely with the memory interconnect 106. In the illustrated embodiment, the opportunistic cache injection scheme described above in reference to FIGS. 1*a* and 1*b* may occur in a substantially similar way. In this embodiment, the L3 cache 232 may still be further, latency-wise, from the central processor 102 than the coherent memory interconnect 106, and therefore the cache injection may still occur to the L2 cache 122 or other closer latency caching tier. FIG. 2*a* illustrates that the disclosed subject matter is not limited to a specific memory topology.

FIG. 2*b* is a block diagram of an example embodiment of the system 201 in accordance with the disclosed subject matter. FIG. 2*b* highlights a difference both in the level of coupling between the lowest level cache (LLC) or L3 cache 332 and in the way a traditional system and the disclosed subject matter move data.

In various embodiments, the system 201 may include a processor 202, a tiered memory system 209 and one or more input/output (I/O) devices 104. In the illustrated embodiment, the tiered memory system 209 may include three tiers (from smallest to largest): a L1 cache 212, a level 2 (L2) cache 222, a level 3 (L3) cache 332, and a main memory 142. In the illustrated embodiment, the L3 cache 332 may not be tightly coupled with the memory interconnect 106 nor the main memory 142 (as was shown in FIGS. 1*a* and 2*a*). Instead the L3 cache 332 (or other caches which are represented by the illustrated L3 cache 332) may be communicatively coupled with the memory interconnect 106 and the rest of the tiered memory system 209 via a bus.

However, despite this loose coupling, the L3 cache 332 may still be considered in-line to the main memory 142 with respect to the I/O device 104 or even the processor 202. Further, the L3 cache 332 may be further, latency-wise, from the processor 202 than the memory interconnect 106, as described below.

FIG. 2*b* shows the traditional data paths employed by traditional system in which data is sent from the I/O device 104 (or non-processor DMA device) and the main memory 142 (illustrated via path 292). Afterwards, the data is moved from the main memory 142 to the L2 cache 222 or L1 cache 212 (illustrated via path 294). As is shown this typical occurs via the L3 cache 332. Often this is done because the L3 cache 332 is considered a shared cache that is topologically between main memory 142 and the one or more processors (see FIG. 3 for a simplified embodiment with multiple processors). In such an embodiment, the latencies experienced by the processor 202 are relatively high.

Data path 296 illustrates that in the disclosed subject matter, data may be moved directly from the I/O device 104 to the L2 cache 222 (or L1 cache 212) via opportunistic cache injection that reduces or tempers potential cache pollution. Data path 296 also illustrates that eventually, the data may be moved from the L2 cache 222 to main memory 142. It is understood that the above is merely one illustrative example to which the disclosed subject matter is not limited.

FIG. 3 is a block diagram of an example embodiment of the system 300 in accordance with the disclosed subject matter. In various embodiments, the system 300 may include a plurality of processors or processor cores (e.g., processors 302*a*, 302*b*, 302*c*, etc.), each of the processors 302*a*, 302*b*, and 302*c*, may be associated with respective caches (e.g., L1 caches 312*a*, 312*b*, 312*c*; and L2 cache 322*a*, 322*b*, 322*c*, etc.), a common or shared memory interconnect 106, a common or shared L3 or last level (LLC) cache 132, a common or shared main memory 142, and one or more input/output (I/O) devices 104. In the illustrated embodiment, a tiered memory system 308 may include three tiers (from smallest to largest): the L1 caches 312*a*, 312*b*, & 312*c*, the level 2 (L2) caches 322*a*, 322*b*, & 322*c*, the level 3 (L3) cache 132, and the main memory 142. It is understood that the above is merely one illustrative example to which the disclosed subject matter is not limited.

In the illustrated embodiment, the technique described above in reference to FIG. 1*a* may occur in substantially the same manner. However, in the illustrated embodiment, the snoop request may generate or result in more than the two cache tag hits described in reference to FIG. 1*a*. In various embodiments, more than one cache may store a copy of the data 190. This example shows a copy within the first processor's L2 cache 322*a* and a second within the third processor's L2 cache 322*c*. In various embodiments, both of these L2 caches 332*a* and 322*c* may generate cache tag hits.

In such an embodiment, the memory interconnect 106 may be faced with two (or more, in some instances) caching tiers that are both closer, latency-wise, to the respective processors 302*a* and 302*c* than the memory interconnect 106. In such an embodiment, the memory interconnect 106 may select one of the multiple caches to be the receiving cache for the cache injection. In one embodiment, this selection may be based upon one or more predefined selection criteria (e.g., most recently used, invalid vs. valid, a processor affinity preference, a round robin scheme, lowest latency, etc.). It is understood that the above are merely a few illustrative examples to which the disclosed subject matter is not limited.

In various embodiments, the unselected cache's data may be invalidated if it is not currently invalidated. This may occur as part of the snoop process, as described above. It is understood that the above is merely one illustrative example to which the disclosed subject matter is not limited.

Figure 4:
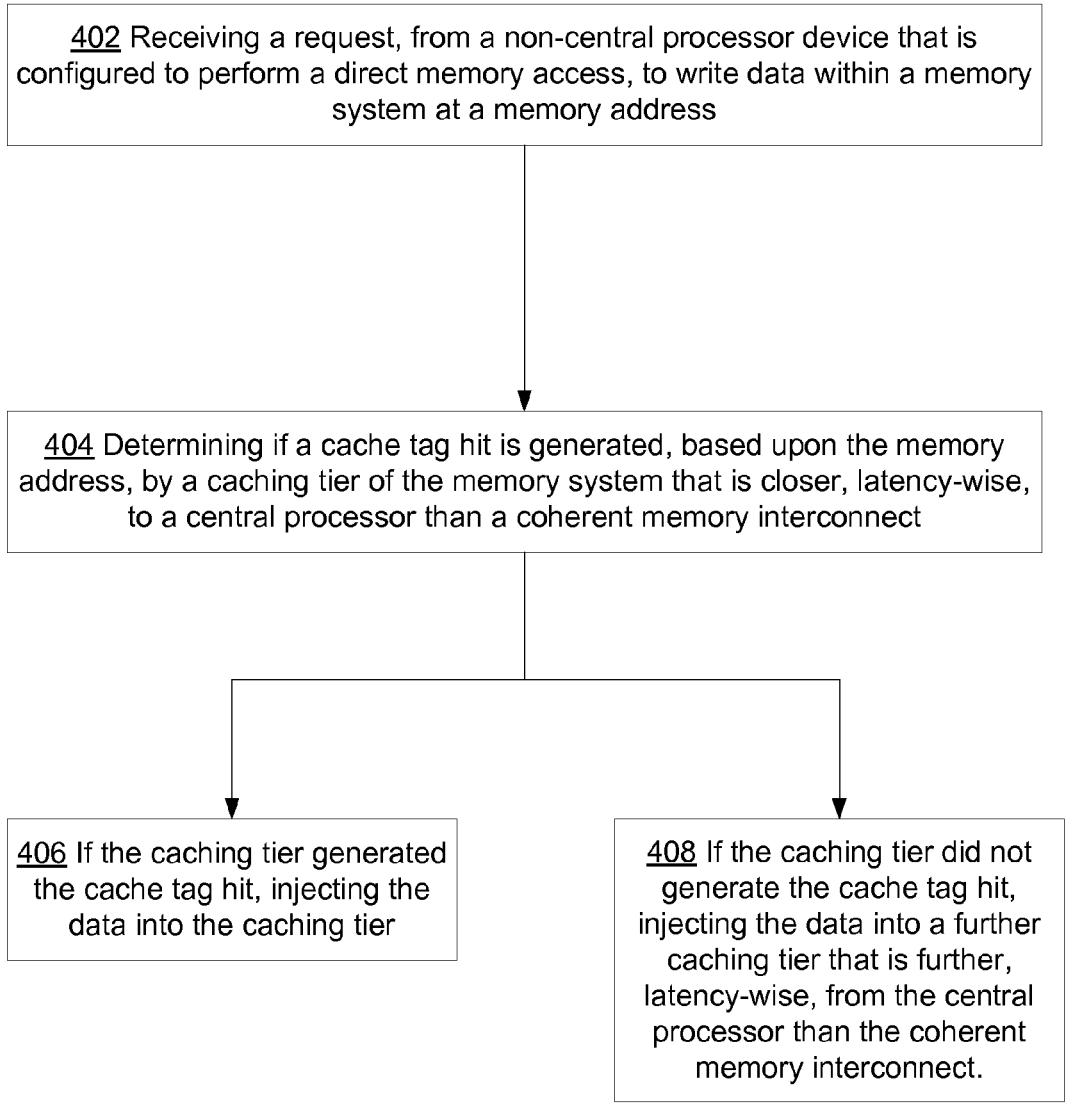
FIG. 4 is a flowchart of an example embodiment of a technique in accordance with the disclosed subject matter.

FIG. 4 is a flow chart of an example embodiment of a technique 400 in accordance with the disclosed subject matter. In various embodiments, the technique 400 may be used or produced by the systems such as those of FIGS. 1*a*, 1*b*, 2*a*, 2*b*, 3, or 5. Although, it is understood that the above are merely a few illustrative examples to which the disclosed subject matter is not limited. It is understood that the disclosed subject matter is not limited to the ordering of or number of actions illustrated by technique 400.

Block 402 illustrates that, in one embodiment, a request may be received to write data within a memory system at a memory address, as described above. In some embodiments, this request may be received from a non-central processor device that is configured to perform a direct memory access, as described above. In some embodiments, this request may be received by a memory interconnect, as described above. In various embodiments, the request may not overtly indicate that the data is to be injected into a caching tier, as described above. In various embodiments, one or more of the action(s) illustrated by this Block may be performed by the apparatuses, systems, or components of FIG. 1*a*, 1*b*, 2*a*, 2*b*, 3, or 5, the memory system, memory interconnect and/or I/O device of FIG. 1*a*, 1*b*, 2*a*, 2*b*, or 3, as described above.

Block 404 illustrates that, in one embodiment, it may be determine if a cache tag hit is generated, based upon the memory address, by a caching tier of the memory system that is closer, latency-wise, to a central processor than a coherent memory interconnect, as described above. In some embodiments, determining may include sending a snoop request to the caching tier, and receiving a snoop response from the caching tier, as described above. In another embodiment, determining may include receiving a plurality of cache tag hits from a plurality of caching tiers that are each closer, latency-wise, to a respective central processor than the coherent memory interconnect, and selecting a selected caching tier from the plurality of the plurality of caching tiers, as described above. In yet another embodiment, determining may include invalidating a cache line associated with the cache tag hit, as described above. In some embodiments, determining may include considering a cache tag hit to be generated regardless if the cache tag hit is associated with a valid cache line or an invalid cache line, as described above. In various embodiments, one or more of the action(s) illustrated by this Block may be performed by the apparatuses, systems, or components of FIGS. 1a, 1b, 2a, 2b, 3, or 5, the memory system and/or memory interconnect of FIG. 1a, 1b, 2a, 2b, or 3, as described above.

Block 406 illustrates that, in one embodiment, if a cache tag hit was generated by the caching tier, injecting the data into the caching tier, as described above. In various embodiments, injecting the data into the caching tier may include tempering cache pollution by only injecting the data into the caching tier if the caching tier generated the cache tag hit, as described above. In another embodiment in which a plurality of caching tiers responded with a cache hit, injecting may include injecting the data into the selected caching tier, as described above. In yet another embodiment in which a cache line associated with the cache tag hit is invalidated, injecting may include causing the caching tier to pre-fetch the data from the coherent memory interconnect, as described above. In various embodiments, one or more of the action(s) illustrated by this Block may be performed by the apparatuses, systems, or components of FIGS. 1a, 1b, 2a, 2b, 3, or 5, the memory system and/or memory interconnect of FIG. 1a, 1b, 2a, 2b, or 3, as described above.

Block 408 illustrates that, in one embodiment, if the caching tier did not generate the cache tag hit, injecting the data into a further caching tier that is further, latency-wise, from the central processor than the coherent memory interconnect, as described above. In various embodiments, one or more of the action(s) illustrated by this Block may be performed by the apparatuses, systems, or components of FIGS. 1a, 1b, 2a, 2b, 3, or 5, the memory system and/or memory interconnect of FIG. 1a, 1b, 2a, 2b, or 3, as described above.

Figure 5:
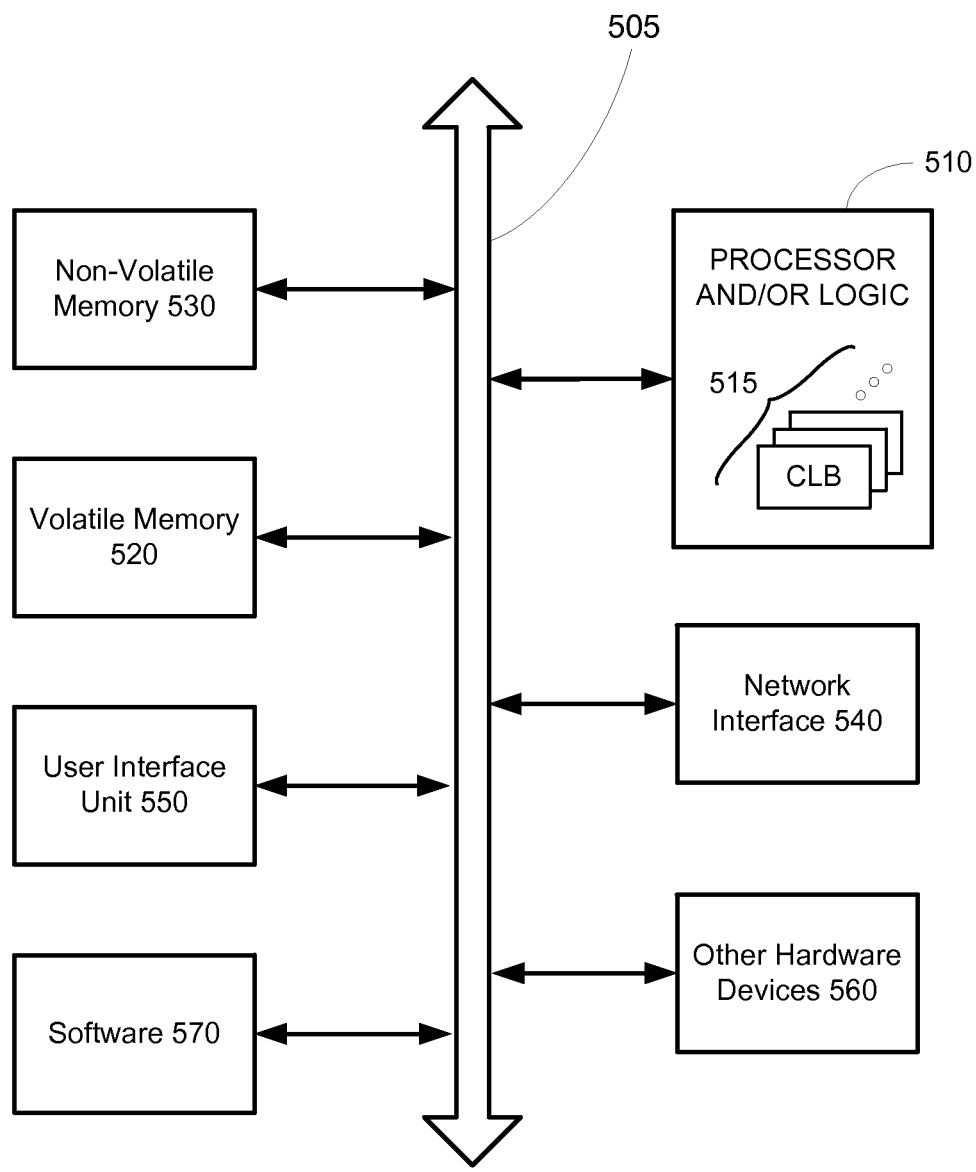
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM), etc.). The information processing system 500 according to the disclosed subject matter may further include a non-volatile memory 530 (e.g., a hard drive, an optical memory, a NAND or Flash memory, etc.). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 500 according to the disclosed subject matter may further include a user interface unit 550 (e.g., a display adapter, a haptic interface, a human interface device, etc.). In various embodiments, this user interface unit 550 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor, etc.). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540, etc.) of the information processing system 500. In such an embodiment, the information processing system 500 may include one or more native applications, which may be installed locally (e.g., within the non-volatile memory 530, etc.) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A method comprising:
    receiving a request, from a non-central processor device that is configured to perform a direct memory access, to write data within a memory system at a memory address;
    determining if a cache tag hit is generated, based upon the memory address, by a caching tier of the memory system that is closer, latency-wise, to a central processor than a coherent memory interconnect;
    if the caching tier generated the cache tag hit, injecting the data into the caching tier regardless of whether or not the caching tier has been specifically configured for cache injection; and
    wherein injecting the data into the caching tier comprises causing the caching tier to pre-fetch the data from a buffer included by the coherent memory interconnect.

2. The method of claim 1, wherein the request does not overtly indicate that the data is to be injected into the caching tier.

3. The method of claim 1, further comprising, if the caching tier of the memory system that is closer, latency-wise, to a central processor than a coherent memory interconnect did not generate the cache tag hit, injecting the data into a further caching tier that is further, latency-wise, from the central processor than the coherent memory interconnect.

4. The method of claim 1, wherein injecting the data into the caching tier comprises:
    tempering cache pollution by only injecting the data into the caching tier if the caching tier generated the cache tag hit.

5. The method of claim 1, wherein determining if a cache tag hit is generated by a caching tier of the memory system comprises:
    receiving a plurality of cache tag hits from a plurality of caching tiers that are each closer, latency-wise, to a respective central processor than the coherent memory interconnect, and selecting a selected caching tier from the plurality of the plurality of caching tiers; and wherein injecting the data into the caching tier comprises injecting the data into the selected caching tier.

6. The method of claim 1, wherein determining if the cache tag hit is generated by the caching tier, comprises:
sending a snoop request to the caching tier, and
receiving a snoop response from the caching tier.

7. The method of claim 1, wherein determining if a cache tag hit is generated by a caching tier of the memory system comprises invalidating a cache line associated with the cache tag hit.

8. The method of claim 1, wherein determining if the cache tag hit is generated comprises considering a cache tag hit to be generated regardless of whether the cache tag hit is associated with a valid cache line or an invalid cache line.

9. An apparatus comprising:
a high latency memory configured to store data, wherein the high latency memory is further, latency-wise, from a central processor than a memory interconnect;
a low latency memory configured to store data, wherein the low latency memory is closer, latency-wise, to a central processor than the memory interconnect; and
the memory interconnect configured to:
receive a request, from a non-central processor device that is configured to perform a direct memory access, to write data at a memory address,
request that the low latency memory provide, based upon the memory address, the memory interconnect with either a cache tag hit or a cache tag miss, and
if the low latency memory provided a cache tag hit, inject the data into the low latency memory, regardless of whether or not the caching tier has been specifically configured for cache injection, wherein injecting the data into the low latency memory comprises causing the low latency memory to pre-fetch the data from a buffer included by the memory interconnect.

10. The apparatus of claim 9, wherein the request does not overtly indicate that the data is to be injected into the low latency memory.

11. The apparatus of claim 9, wherein the memory interconnect is configured to, if the low latency memory provided a cache tag miss, inject the data into the high latency memory.

12. The apparatus of claim 9, wherein the memory interconnect is configured to minimize cache pollution by only injecting the data into the low latency memory if the low latency memory generated the cache tag hit.

13. The apparatus of claim 9, wherein the apparatus comprises a plurality of low latency memories, and the plurality of low latency memories comprises the low latency memory; and
wherein the memory interconnect is configured to:
receive cache tag hits from two or more of the plurality of low latency memories,
select a selected low latency memory from the two or more of the plurality of low latency memories that generated the cache tag hits, and
inject the data into only the selected low latency memory.

14. The apparatus of claim 9, wherein the memory interconnect is configured to send a snoop request to the low latency memory.

15. The apparatus of claim 9, wherein low latency memory is configured to, in response to the request for the cache tag hit,
invalidate a cache line associated with the cache tag hit.

16. The apparatus of claim 9, wherein the memory interconnect is configured to, if the low latency memory provided a cache tag hit, inject the data into the low latency memory regardless of whether the cache tag hit is associated with a valid cache line or an invalid cache line.

17. A system comprising:
a processor configured to read data from and write data to a tiered memory system;
a non-central processor device that is configured to perform a direct memory access to the tiered memory system, and request to write data to the tiered memory system; and
the tiered memory system comprising:
a high latency memory configured to store data, wherein the high latency memory is further, latency-wise, from a central processor than a memory interconnect,
a low latency memory configured to store data, wherein the low latency memory is closer, latency-wise, to a central processor than the memory interconnect, and
the memory interconnect configured to:
determine, in response to the request by the non-central processor device to write data to the tiered memory system,
request that the low latency memory provide, based at least partially upon the data, the memory interconnect with either a cache tag hit or a cache tag miss, and
if the low latency memory provided a cache tag hit, inject the data into the low latency memory, regardless of whether or not the caching tier has been specifically configured for cache injection, wherein injecting the data into the low latency memory comprises causing the low latency memory to pre-fetch the data from a buffer included by the memory interconnect.

18. The system of claim 17, wherein the memory interconnect is configured to:
attempt to ameliorate cache pollution in the low latency memory, and
if the low latency memory provided a cache tag miss, inject the data into the high latency memory.

19. The system of claim 17, wherein the tiered memory system comprises a plurality of low latency memories, and the plurality of low latency memories comprises the low latency memory; and
wherein the memory interconnect is configured to:
receive cache tag hits from two or more of the plurality of low latency memories,
select a selected low latency memory from the two or more of the plurality of low latency memories that generated the cache tag hits, and
inject the data into only the selected low latency memory.

20. The system of claim 17, wherein the memory interconnect is configured to, if the cache tag hit from low latency memory is associated with an invalid cache line, inject the data into the low latency memory.

* * * * *